United States Patent [19]
Holtz

[11] Patent Number: 4,984,942
[45] Date of Patent: Jan. 15, 1991

[54] TAP WRENCH

[76] Inventor: Leonard Holtz, 9474 Wayside Dr., Sunland, Calif. 91040

[21] Appl. No.: 533,114

[22] Filed: Jun. 4, 1990

[51] Int. Cl.$^5$ .............................................. B23G 1/26
[52] U.S. Cl. .................................. 408/127; 10/129 M; 81/177.75; 279/16; 408/241 R; 464/136
[58] Field of Search ................... 408/127, 141, 241 R, 408/704; 279/16, 17; 464/173, 905, 136, 112, 152, 120; 81/177.75, 177.7; 10/129 M, 129 P, 141 B, 141 H

[56] References Cited

U.S. PATENT DOCUMENTS

| | | | |
|---|---|---|---|
| 944,228 | 12/1909 | Bambridge | 464/173 |
| 1,155,796 | 10/1915 | Cleveland | 279/16 |
| 1,506,331 | 8/1924 | Benkö | 279/16 |
| 1,643,855 | 9/1927 | Peterson . | |
| 2,381,102 | 8/1945 | Boyd | 64/7 |
| 2,499,569 | 3/1950 | Cooley | 64/17 |
| 2,526,105 | 10/1950 | Adams | 81/177.75 |
| 2,636,361 | 4/1953 | Holden | 64/11 |
| 2,775,912 | 1/1957 | Skage | 81/55 |
| 2,987,334 | 6/1961 | Wendling | 287/119 |
| 4,114,401 | 9/1978 | Van Hoose | 64/7 |
| 4,687,384 | 8/1987 | McCoy | 10/129 M |

FOREIGN PATENT DOCUMENTS 232675  12/1968  U.S.S.R. ............................ 464/112

*Primary Examiner*—Daniel W. Howell
*Attorney, Agent, or Firm*—James Bartholomew

[57] ABSTRACT

A tap wrench comprising a handle portion and a chuck is provided with a joint arrangement that allows for axial misalignment of the handle portion and the chuck. The joint comprises a stem that extends from the chuck and provides four planar pins equidistantly spaced thereabout which slidably engage four slots equidistantly spaced about a central opening defined in the handle portion. The stem is retained within the central opening by the engagement of each pin in a respective slot. Oscillation of the stem within the central opening provides for the above-noted axial misalignment.

15 Claims, 1 Drawing Sheet

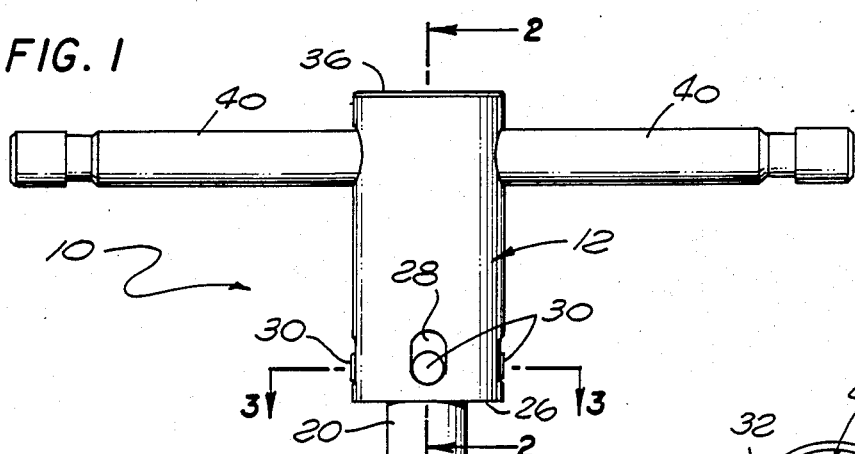
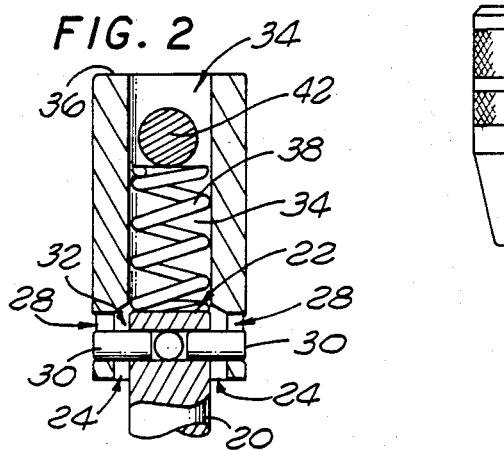
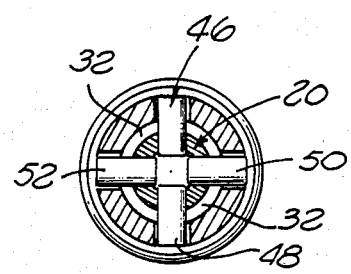
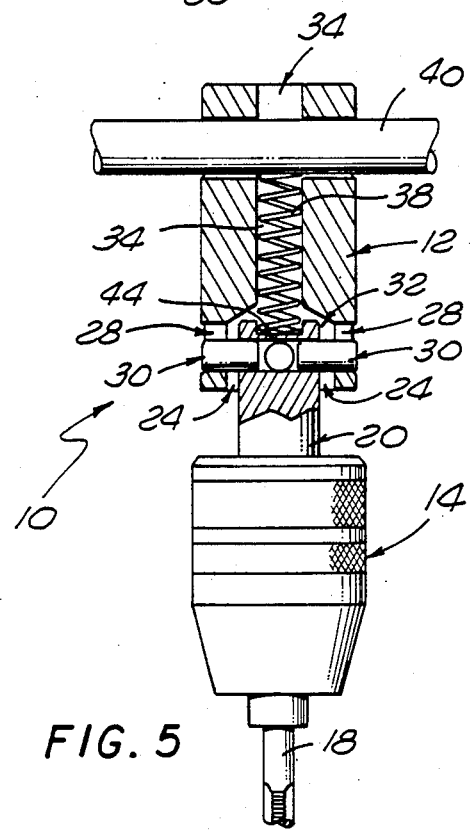
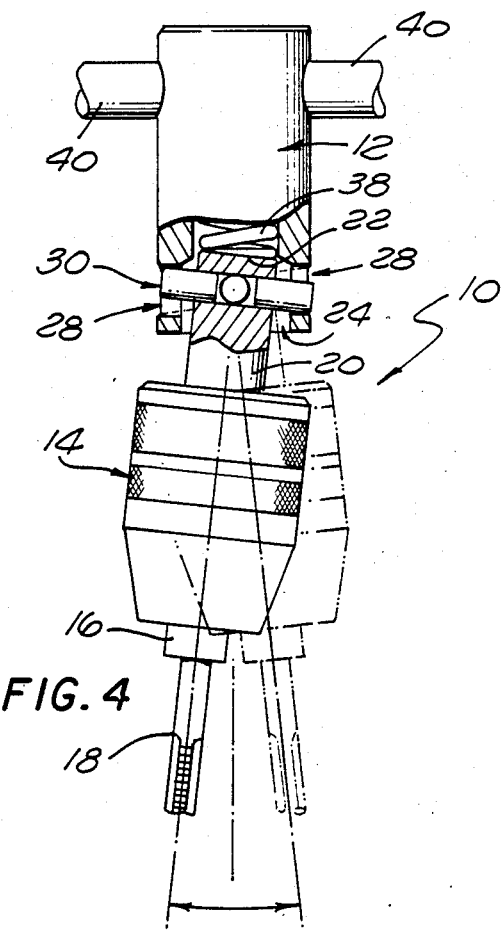

TAP WRENCH

BACKGROUND OF THE INVENTION

This invention relates generally to an improved tap wrench. More particularly, this invention relates to a tap wrench featuring a handle member and a tap-holding chuck, or collet, in an interlocking union that enables the handle member and chuck to be misaligned during the use of the tap wrench without negatively affecting a tapping operation.

When using prior hand-held tap wrenches to manually tap a hole, it is extremely important to maintain perfect axial alignment between the tap handle, tap chuck and tap comprising the tap wrench. Any axial misalignment between the afore-mentioned tap wrench components during the manual application of torque to most prior tap wrenches generally subjects the tap to undesirable stressful distorting forces, often culminating in tap breakage. Unfortunately, since taps are generally made of hard steel or similar materials, they are often relatively brittle, and little lateral pressure (i.e. force undesirably directed contrary to a primary axis of torque defined during tapping holes with a tap wrench) is required to accidentally break conventional taps. The elongated, relative slender design of taps also renders taps fragile and unsuitably resistant to the misalignment-induced lateral forces that are typically generated when prior rigid tap wrenches are employed in a less than ideal manner.

A general inability of users to apply torque to a tap wrench in an ideal manner is a major obstacle in the challenge of reducing tap breakage. This is largely due to the natural construction of the hand and wrist which creates a multi-positionable joint having such a wide range of movement that it is extremely difficult for one to maintain proper orientation between tap wrench, tap and work piece as the hand and wrist are used to provide the rotary twisting motion necessary for cutting internal threads in a work piece with a tap. Usually, only a very slight angularity of pressure on the tap wrench (i.e. pressure that is not directed along the longitudinal axis of the tap) will bind the tap in whatever work piece hole is being tapped and break the tap.

The avoidance of tap breakage, therefore, necessitates that one maintain the tap in an orientation which is perfectly perpendicular to the workpiece during the manual application of torque to the tap wrench. This alignment is very difficult to maintain, especially when the one tapping is in an awkward position or is tapping a workpiece situated in an inaccessible area. Moreover, optimum alignment between tap and work piece is also tough to achieve when tapping hard surface exotic metals or plastics, or when one is inexperienced in tapping holes.

A variety of past devices have been designed to address the problem of taps binding and breaking within the workpiece whenever misdirected applied force causes the tap to assume a non-perpendicular orientation relative to the surface of the workpiece.

Generally speaking such prior devices typically comprise a tap wrench handle member to which torque is manually applied, and another member of the wrench which provides the tap. These two tap wrench members are generally connected by a universal type joint which allows the handle member to be misaligned with the tap-holding member of the tap wrench without permitting the transference of misaligning forces from the handle member to the tap. However, past devices that incorporate a universal type joint to alleviate stress upon a tap are linked with several drawbacks.

A predominant form of universal type joint utilized in tools to permit axial misalignment between a driving member and a driven member (a functional feature highly desirable in tap wrenches) is a conventional ball and socket arrangement. However, utilization of a ball and socket joint in tap wrenches is less than ideal because manufacturing a ball and socket to allow smooth movement of the former within the latter disadvantageously requires the machining of close tolerances, thereby adding undesirably to the cost and/or complexity of the manufacturing process. In general, prior universal type joints typically used in tools have been expensive and difficult to manufacture and also have been difficult to disassemble and reassemble to replace worn parts. Moreover, some universal joints disadvantageously utilize a multi-yoke arrangement which doesn't allow a full range of movement for whatever elements are joined together.

Another criteria which has previously presented an obstacle to effective usage of a universal type joint in prior tap wrenches is the need for one tapping a hole to have a positive feel for the tapping resistance that the workpiece presents to the tap. That is, a tapping tool which incorporates a joint between tap handle and tap must ensure that the joint will not prevent one manipulating the handle from feeling the resistance encountered by the tap. Otherwise, the binding of the tap in the workpiece will be undetected until it is too late and the tap has broken. Thus, a tap wrench necessarily must be designed such that a user can sense tapping resistance. However, many prior tapping devices hinder the achievement of such sensitivity. For example, one prior type of jointed tapping tool is presented in U.S. Pat. No. 2,636,361, which utilizes a flexible joint comprising a ball of resilient material to join a handle member and a tapping member. However, the drawback associated with use of a resilient ball type joint in the context of a tap wrench is that the resilient material provides a shock deadening zone between tap and handle. This shock deadening zone makes it difficult for one manipulating the handle to accurately gauge, or get a sensitive feel for, the tapping resistance being encountered by the tap. As mentioned, this loss of sensitivity often results in broken taps. Yet another drawback associated with the use of a resilient material ball joint is that different applications of a jointed tapping tool will require a ball joint having a different Shore hardness. There exists, therefore, a significant need for an improved tap wrench designed such that misalignment forces exerted on a tap handle will not be transferred to the tap itself, thereby eliminating tap breakage and the resultant tap replacement costs and damage to the work piece. Additionally, an improved tap wrench is needed which translates tap resistance directly to the handle so that a user is provided with a positive feel of the tapping resistance and can operate the tap wrench accordingly. Such an improved tap wrench should incorporate a joint that allows misalignment of the tap and the handle (so that the improved tap wrench is usable in inaccessible places) and, ideally, such a joint should be provided without requiring the machining of close tolerances, as in a ball and socket joint or the use of shock-deadening materials which inhibit sensitivity to tap resistance. The present invention fulfills these needs in a rugged and relatively

SUMMARY OF THE INVENTION

The present invention resides in an improved tap wrench featuring an improved universal-type joint that connects a tap wrench handle portion with a tap chuck or collet such that, during manipulation of the tap wrench, the joint advantageously allows axial misalignment of the longitudinal axes of the handle portion and the chuck while simultaneously providing for the transmission of applied pressure from the handle portion to a tap held within the chuck. The joint allows the handle portion and tap chuck to be misaligned with respect to each other within a wide range of positions so that the tap wrench is able to adapt itself to the direction of whatever hole into which the tap wrench is introduced for tapping purposes.

Advantageously, the feature whereby opposite ends of the tap wrench may be axially misaligned enables the tap wrench to be used in areas of limited accessibility, such as tight spots where the tap wrench handle must be tilted relative to the tap chuck in order to allow manipulation of the handle in close quarters or awkward positions. Moreover, the benefit of providing a tap wrench handle which may be misaligned relative to the tap is that lateral thrust forces developed during manual manipulation of the handle will not be transferred to the tap itself, but rather will be dissipated by the operation of the joint to permit axial misalignment of the tap wrench ends. This provision, wherein transference of lateral forces from tap handle to tap is minimized, advantageously eliminates the major cause of tap breakage. Thus the present invention desirably prolongs the life of taps, which are expensive to replace. Furthermore, the present invention advantageously features a joint arrangement which is not a ball and socket system so that close tolerances need not be machined during production of the joint portion of the tap wrench. Thus, manufacturing costs are lowered because of the elimination of close tolerance relationship within the tool. Moreover the inventive tap wrench features a rugged and relatively inexpensive construction that provides a tool having movable sections which allow the tap to more easily align itself with the hole being tapped.

In a preferred form of the invention, the tap wrench comprises two portions, a handle portion and a chuck or collet, which may be axially misaligned through the action of a joint uniting the two portions. The handle portion includes a body member having an exterior cylindrical surface with an axially directed, cylindrical central opening in a first end thereof. In communication with the cylindrical opening are four slots spaced ninety degrees apart around the cylindrical body member. A reduced diameter spring channel extends concentrically from the central opening and exits out a second end of the body member. The handle of the tap wrench is removably disposed within a cross bore that is provided within the body member proximate the second end thereof. This crossbore is transverse to, and in communication with, the spring channel.

The chuck accommodates a removable tap in expandable jaws at a first end thereof and terminates at a second end in a cylindrical stem having a relatively flat head that includes four planar pins projecting therefrom at equidistantly spaced locations around said stem. The four pins engage the four slots in the body member, thereby comprising a joint which allows axial misalignment of the chuck and the body member. The stem of the chuck is adapted to oscillate within the body member into various positions whereat said chuck and said body member are misaligned. The four pins each slide in a respective one of said four slots to allow oscillation of the stem within the body member. Advantageously, these pins allow the transfer of driving torque from the handle to the tap while simultaneously minimizing the transference of lateral thrust from the handle to the tap. Such lateral thrust is often inadvertently applied to the handle during manual manipulation thereof, and is desirably eliminated because it is a major factor causing tap breakage. The universal-type joint compensates for this lateral thrust (i.e. side-to-side motion applied to the handle) because lateral force which would be transferred from handle to tap is instead taken up by the joint, thus avoiding jamming of the tap in the workpiece and breakage of the tap.

The spring channel contains a coil spring held in compression between the flat head of the stem and the handle within the crossbore. The removable handle retains said spring within said spring channel; for this reason the crossbore must be in communication with the spring channel. Removal of the handle allows access to the spring channel so that the spring may be changed to meet specific tapping requirements. The flat head of the stem may include a groove or circular indentation for locating and retaining one end of said spring. The neck portion of the stem is tapered to a reduced diameter, between the flat head and the chuck thereby providing clearance for the body member surrounding the stem in order to facilitate oscillation of the stem within the cylindrical opening of the body member.

The improved joint arrangement utilized in the present invention advantageously allows axial misalignment of the longitudinal axes of the handle and tap, however, use of the joint is not restricted to tap wrenches. The joint arrangement described herein may be effectively employed in any tool having multiple members which may be subjected to axially misaligning forces.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of a tap wrench embodying the invention, showing a body member which accommodates a handle and engages pins of a chuck member with a tap being shown within the chuck member, said tap being presented in a fragmented view;

FIG. 2 is a fragmentary, cross-sectional view taken generally on line 2—2 of FIG. 1, illustrating the interior of the body member which provides a spring channel having a spring retained therein, a cross bore that accommodates the handle of FIG. 1, and slots which retain pins projecting from a stem portion of the chuck member of FIG. 1;

FIG. 3 is a cross sectional view taken generally on line 3—3 of FIG. 1, illustrating four pins which are equidistantly spaced around the stem portion of FIG. 2 and which project therefrom to engage four slots which are equidistantly spaced around the body member, and also depicting a gap between the stem portion and interior of the body member, said gap alleviating any need to machine close tolerances when manufacturing the stem portion and the interior of the body member;

FIG. 4 is a fragmentary perspective view similar to FIG. 1 with the body member being shown in partial cut-away to reveal the movement of the pins within their slots as the chuck member of the tap wrench is axially misaligned with the body member, said chuck member also being shown in phantom outline to illustrate movement of the chuck member relative to the body member; and FIG. 5 is a fragmentary perspective view similar to FIG. 1 with the body member being shown in cross section to illustrate inclusion of a different size spring channel and spring, also showing a stem portion having a slotted head which retains one end of the spring, and further showing retention of the pins of the chuck member within the slots of the body member, said pins and slots comprising a jointed arrangement within the tap wrench.

DETAILED DESCRIPTION OF THE PREFERRED EMBODIMENT

As shown in the drawings for purposes of illustration, the present invention resides in a tap wrench 10 (FIG. 1) featuring an improved joint that allows driving torque exerted by a workman to be transmitted solidly to the tap wrench while said wrench is tapping a hole within a workpiece. Advantageously, if the workman inadvertently applies a lateral force to a handle portion of the tap wrench, the improved joint will dissipate this lateral force by allowing axial misalignment of the handle portion and a chuck of the tap wrench, thereby ensuring that this lateral force is not transferred to a tap within said chuck and thus eliminating a major cause of tap breakage. The tap wrench 10 generally comprises a body member 12 and a chuck or collet 14 that may be misaligned through action of the joint which is described hereinafter.

Advantageously, the joint translates tap resistance (i.e. the resistance of the workpiece to the tap) directly from the tap to the handle thereby providing the workman with a positive feel of the tap torque at the handle. This enables one to properly gauge the tap resistance which the workpiece is presenting to the tap so that excessive force will not be applied to a tap which is binding within the workpiece because such action will eventually break the tap. The present invention not only dramatically reduces the breakage of taps, but also allows the tap wrench to be manipulated in areas of limited accessability because the joint permits tilting of the body member 12 and the chuck 14 to occur relative to the axial line (indicated 2—2 in FIG. 1) of the tap wrench 10. The improved joint utilized in the present invention is preferred over prior universal joints featuring a ball and socket arrangement because the joint of the present invention does not require close tolerances to be machined as during the manufacture of a ball joint. Thus, the manufacturing costs and complexity is desirably reduced with use of the joint described herein.

In accordance with the present invention, the tap wrench 10 includes a chuck or collet 14 having expandable jaws 16 which removably retain a tap 18 of any conventional size. The collet 14 terminates in an axially extending stem 20 having a cylindrical shape and a flat head 22 (FIG. 2). The stem 20 is sized to fit within the body member 12. The body member 12 has an exterior cylindrical surface with an axially directed cylindrical central opening 24 in a first end 26 thereof. In communication with the cylindrical central opening 24 are four slots 28 spaced ninety degrees or equidistantly apart around the body member 12. The stem 20 fits within the central opening 24 such that four planar pins 30 projecting radially outwardly from said stem extend into the slots 28 and are slidably engaged therein. The pins 30 are equidistantly spaced around the stem 20 proximate the flat head 22. One or more of these pins may be depressed into the stem 20 in order to permit installation of the stem 20 within the central opening 24.

The stem 20 is able to oscillate within the opening 24 in the body member 12 into a variety of positions as shown in phantom outline in FIG. 4. The ability of the pins 30 to slide within the slots 28 allows the stem 20 to freely tilt relative to the longitudinal axis (line 2—2 of FIG. 1) of the body member 12. Note in FIGS. 2-5 that a gap 32 exists between the stem 20 and the interior of the body member 12. This gap not only facilitates movement of the stem within the central opening 24, it also ensures that close tolerances between the stem and the body member are unnecessary and need not be machined for proper operation of the joint comprised of the slots 28 and the pins 30.

A reduced diameter spring channel 34 (FIGS. 2, 4 and 5) extends concentrically from the central opening 24 and exits out an end 36 of the body member 12. The spring channel 34 contains a coil spring 38 that is held in compression between the flat head 22 of the stem 20 and a handle 40 that is removably retained with a cross bore 42 (FIG. 2). This cross bore 42 passes through the body member 12 proximate its end 36 such that said bore 42 is perpendicular to, and in communication with, the spring channel 34. The handle 40 can be withdrawn from the cross bore 42 in order to gain access to the interior of the spring channel 34, thereby allowing one to change the spring 38. The flat head 22 may include an indent, groove, slot or the like (designated by reference numeral 44 in FIG. 5) that will retain one end of the spring 38.

The spring 38 serves a dual stabilizing purpose. It maintains a normal, non-use alignment of the body member 12 and the chuck 14 by applying pressure to the flat head 22, thereby producing a seating action of the pins 30 against the lower extreme of the slots 28 and creating a co-axial, concentric alignment of the tap and the longitudinal axis 2—2 of the tap wrench 10. The spring 38 also applies friction pressure to the handle 40 to maintain the position of the handle 40 within the cross bore 42, thereby preventing the handle from becoming unintentionally disengaged from the body member 12. The handle 40 is used to apply a torqueing force to the tap 18 while the spring 38 serves to maintain a starting alignment of the tap 18 and body member 12. The spring 38 may be replaced with a different size spring suitable to match the size and resistance of the tap 18 being used. FIGS. 2 and 5 illustrate different sizes 38 and spring channels 34. With use of a smaller size spring, as in FIG. 5, inclusion of a groove 44 in the flat head 22 of stem 20 is recommended.

In use, the joint arrangement comprising the pins 30 and the slots 28 maintains positive driving torque while allowing coaxial side movement of the body member 12 and the chuck 14 relative to the axial line of the tap wrench 10. This is accomplished by a smooth transition of the pins 30 from their alternating functions wherein one opposing pair of pins (for example, pins 46 and 48 in FIG. 3) is acting as a fulcrum or pivot point while the other pair of pins (for example, pins 50 and 52 in FIG.

3) transfers a driving torque from the body member 12 to the chuck 14 as the tap wrench 10 is turned. As the tap wrench is torqued or driven, there is a noticeable amount of lateral or side pressure exerted on the tap wrench inadvertently by non-uniform hand and wrist action. The pins 30 slidably interposed within the slots 28 allow this pressure to be dissipated without allowing the lateral pressure to be transferred to the tap 18. Advantageously, this dissipation of undesirable forces does not affect the pins ability to transmit a positive torque from handle 40 to chuck 14. That is, while said pins 30 are transmitting positive torque or driving force, the handle 40 and body member 12 can be moving in any angular position relative to the chuck 14 without undue stress or binding of any or all component parts.

With reference to FIG. 3, the manner in which the pins 30 alternate as pivot or fulcrum points will now be expounded upon. Basically, while one pair of opposing pins function as a fulcrum, the other pins act as a stop means which define limits for the amount of rotation of the body member which is possible about a particular defined fulcrum.

For example, in FIG. 3, when the body member 12 is rotatable about a fulcrum defined by pins 46 and 48, pins 50 and 52 function as stop means. Similarly, when the body member is rotatable about a fulcrum defined by pins 50 and 52, pins 46 and 48 provide stop means. However with reference to FIG. 3, not only can the body member 12 pivot about the fulcrum defined by pins 50 and 52 in the direction of twelve o'clock and six o'clock (viewing FIG. 3 as a clock face with pin 46 akin to twelve o'clock) and pivot about the fulcrum defined by pins 46 and 48 in the direction of three o'clock and nine o'clock, but the planar pins 30 also allow movement of the body member 12 in the directions, for example, of five o'clock, eight o'clock eleven o'clock, etc. This is because the body member 12 can also pivot about any two consecutive pins, for example, about pins 46 and 50. In this example, pins 48 and 52 would provide stop means. In order to facilitate the above-described freedom of motion, the stem 20 has a tapered portion of narrower diameter proximate the end 26 of body member 12. The gap 32 is also a contributing feature facilitating movement of the stem 20 within the body member 12 because it prevents rubbing of these two elements, thereby negating a friction factor which would otherwise hinder motion of the stem relative to the body member.

From the foregoing, it will be appreciated that the tap wrench of the present invention features an improved joint arrangement which allows axial misalignment of the longitudinal axes of a handle portion and chuck portion of the tool, thereby ensuring that any undesirable lateral forces will be dissipated by action of the joint rather than transferred to the tap. This prevents a major cause of tap breakage. Moreover, the improved joint arrangement advantageously accomplishes this lateral force dissipation without negatively affecting the ability of the joint to transmit driving torque from the handle to the tap. Further, the tap wrench of the present invention can advantageously be manufactured without requiring the machining of close tolerances required in prior art ball and socket universal joints. Further still, the improved tap wrench features a rugged and relatively inexpensive construction which is readily available for use of the tool in inaccessible areas.

While a particular form of the invention has been illustrated and described, it will be apparent that various modifications can be made without departing from the spirit and scope of the invention. For example, the design and dimensions of the body member and chuck may be varied to correspond with loadings encountered. Moreover, it should be noted that the improved joint featured in the tap wrench disclosed herein can be used in tools other than tap wrenches and is suitable for use in any tool having members which may be advantageously misaligned. Accordingly, it is not intended that the invention be limited, except by the appended claims.

I claim:

1. A joint usable for tools in which two or more tool members may be misaligned, said joint comprising
    a body member having an axially extending cylindrical opening in a first end thereof, said cylindrical opening being defined by a cylindrical wall having four slots equidistantly spaced therearound; and
    a stem member comprising a cylindrically shaped shank having four pins projecting therefrom, said pins being equidistantly spaced about said shank such that all pins lie in one plane that is oriented substantially perpendicular to the longitudinal axis of said shank, said stem member being disposed within said cylindrical opening of said body member such that each of said pins is slidably retained within one of said slots, and such that a gap spaces non-pin portions of said stem member from inner surfaces of said cylindrical wall, wherein said stem member is moveable relative to said body member.

2. A joint as set forth in claim 1, wherein said body member further includes a spring channel that comprises a bore extending coaxially from said cylindrical opening, said bore extending towards a second end of said body member and containing a spring having a first end which abuts said stem member and a second end which abuts means for retaining said spring in said spring channel.

3. A joint as set forth in claim 2, wherein said bore is of a smaller diameter than said cylindrical opening.

4. A joint as set forth in claim 2, wherein said retaining means is removable from said body member, thereby providing access to said spring channel so that said spring may be changed.

5. A tap wrench comprising:
    a body member providing handle means for applying torque to said body member, said body member having an axially extending cylindrical opening in a first end thereof, said cylindrical opening being defined by a cylindrical wall having four slots equidistantly spaced therearound;
    collet means for operatively retaining a tap, said collet means having expandable jaw members with a tap retained therein at a first end of said collet means and said collet means having a cylindrically shaped shank extending from a second end thereof, said shank having four pins projecting therefrom, with each of said pins being equidistantly spaced about said shank such that all pins lie in one plane that is oriented substantially perpendicular to the longitudinal axis of said shank, said shank being disposed within said cylindrical opening of said body member such that each of said pins is slidably retained within one of said slots, and such that a gap spaces non-pin portions of said shank from inner surfaces of said cylindrical wall, wherein said collet means is moveable relative to said body member in a manner permitting axial misalignment of said collet means and said body member.

6. A tap wrench as set forth in claim 5 wherein said body member further includes a spring channel that comprises a bore extending coaxially from said cylindrical opening, said bore extending towards a second end of said body member and containing a spring having a first end which abuts said shank and a second end which abuts means for retaining said spring in said spring channel.

7. A tap wrench as set forth in claim 6, wherein said retaining means is removeable from said body member, thereby providing access to said spring channel so that said spring may be changed.

8. A tap wrench as set forth in claim 7, wherein said retaining means is provided by said handle means.

9. A tap wrench as set forth in claim 6, wherein said body member further includes a second bore therethrough which is transverse to, and intersecting with, said bore comprising the spring channel, wherein said retaining means comprises a removeable handle disposed within said second bore, wherein the location of said handle in the second bore of the body member is such that said handle abuts said spring, and wherein removal of said handle from said second bore provides access to said spring channel.

10. A tap wrench as set forth in claim 5, wherein one end of said shank is enclosed within said cylindrical opening of said body member, wherein said enclosed shank end provides said four pins and terminates in a substantially flat head, and wherein said flat head is spaced from inner surfaces of said cylindrical wall by said gap.

11. A tap wrench as set forth in claim 5, wherein said pins are spaced ninety degrees apart about said cylindrically shaped shank.

12. A tap wrench as set forth in claim 5, wherein said pins have a relatively circular cross sectional profile and wherein positioning the pins at various locations within the slots enables one to change the orientation of the shank relative to the body member.

13. A tap wrench as set forth in claim 13, wherein each of said slots extends lengthwise along an axis which is parallel to the longitudinal axis of the body member, said lengthwise extension of each slot being greater than the diameter of said circular pins and wherein said slots are configured with a width that is slightly larger than the diameter of said pins.

14. A tap wrench as set forth in claim 5, wherein two of said four pins provide a first pair of pins which are disposed at opposite locations on said shank such that the two pins comprising said first pair lie along a first common axis which coincides with the longitudinal axis of each pin of said first pair, wherein the other two of said four pins provide a second pair of pins which are also disposed at opposite locations on said shank such that the two pins comprising said second pair lie along a second common axis which coincides with the longitudinal axis of each pin of said second pin, wherein said second common axis is substantially perpendicular to said first common axis, and wherein said first pair of pins define a first fulcrum about which said body member is moveable relative to said shank ad said second pair of pins define a second fulcrum about which said body member is also moveable relative to said shank.

15. A tap wrench as set forth in claim 14, wherein said second pair of pins functions as stop means for limiting a range of movement of said body member about said first fulcrum, and wherein said first pair of pins functions as stop means for limiting a range of movement of said body member about said second fulcrum.

* * * * *